(12) United States Patent
Zink et al.

(10) Patent No.: US 7,837,267 B2
(45) Date of Patent: Nov. 23, 2010

(54) LOCK FOR FORWARD-FOLDING BACKREST

(75) Inventors: Paul T. Zink, Indianapolis, IN (US); Andrew B. Mendenhall, Mooresville, IN (US)

(73) Assignee: Cosco Management, Inc., Wilmington, DE (US)

( * ) Notice: Subject to any disclaimer, the term of this patent is extended or adjusted under 35 U.S.C. 154(b) by 295 days.

(21) Appl. No.: 12/037,143

(22) Filed: Feb. 26, 2008

(65) Prior Publication Data
US 2008/0224513 A1 Sep. 18, 2008

Related U.S. Application Data

(60) Provisional application No. 60/894,599, filed on Mar. 13, 2007.

(51) Int. Cl.
*B60N 2/02* (2006.01)
*A47D 1/10* (2006.01)
*A47C 7/54* (2006.01)

(52) U.S. Cl. .............................. 297/378.12; 297/250.1; 297/297; 297/411.32

(58) Field of Classification Search ................ 297/255, 297/256, 378.12, 378.1, 411.32, 411.38, 297/411.37, 250.1
See application file for complete search history.

(56) References Cited

U.S. PATENT DOCUMENTS

| | | | |
|---|---|---|---|
| 1,641,953 A | 9/1927 | Abraham | |
| 1,742,822 A | 1/1930 | Olson | |
| 3,762,768 A | 10/1973 | Hyde et al. | |
| 4,986,600 A | 1/1991 | Leblanc et al. | |
| 5,121,965 A | 6/1992 | Skold et al. | |
| 5,496,092 A | 3/1996 | Williams et al. | |
| 5,499,860 A | 3/1996 | Smith et al. | |
| 5,647,634 A | 7/1997 | Presser et al. | |
| 5,785,383 A | 7/1998 | Otero | |
| 5,803,543 A | 9/1998 | Hartmann | |
| 6,179,362 B1 | 1/2001 | Wisniewski et al. | |
| 6,685,266 B2 * | 2/2004 | James et al. | 297/250.1 |
| 6,767,058 B2 | 7/2004 | McClellan-Derrickson | |
| 6,773,064 B2 | 8/2004 | Tren et al. | |
| 6,840,577 B2 | 1/2005 | Watkins | |
| 6,908,151 B2 | 6/2005 | Meeker et al. | |
| 6,932,429 B2 | 8/2005 | Kamiki | |
| 7,000,985 B2 | 2/2006 | Belgarde | |
| 2004/0061366 A1 | 4/2004 | Meeker et al. | |
| 2004/0124677 A1 | 7/2004 | Meeker et al. | |
| 2005/0052059 A1 | 3/2005 | Oto | |
| 2005/0186068 A1 | 8/2005 | Coulson et al. | |
| 2005/0264059 A1 | 12/2005 | Clement et al. | |
| 2005/0264065 A1 | 12/2005 | Clement et al. | |
| 2006/0006712 A1 | 1/2006 | Clement et al. | |
| 2006/0012234 A1 | 1/2006 | Collias | |
| 2006/0138823 A1 | 6/2006 | Huang | |
| 2007/0236061 A1 | 10/2007 | Meeker et al. | |

* cited by examiner

*Primary Examiner*—Milton Nelson, Jr.
(74) *Attorney, Agent, or Firm*—Barnes & Thornburg LLP (57) ABSTRACT

A juvenile vehicle seat includes a seat base adapted to set on a vehicle seat and a foldable backrest associated with the seat base. The juvenile vehicle seat also includes a backrest lock coupled to the foldable backrest.

14 Claims, 6 Drawing Sheets

LOCK FOR FORWARD-FOLDING BACKREST

This application claims priority under 35 U.S.C. §119(e) to U.S. Provisional Application Ser. No. 60/894,599, filed Mar. 13, 2007, which is expressly incorporated by reference herein.

BACKGROUND

The present disclosure relates to juvenile vehicle seats, and in particular, to vehicle seats having backrests that move relative to seat bottoms. More particularly, the present disclosure relates to a foldable juvenile vehicle seat having a releasable backrest lock.

SUMMARY

A juvenile vehicle seat in accordance with the present disclosure includes a stationary seat base and a seat back including a foldable backrest and a backrest lock. The backrest lock is configured normally to lock the foldable backrest in an upright use position relative to the stationary seat base. The backrest lock can be operated by a caregiver so that the foldable backrest is released and free to move relative to the seat base to assume a compact folded storage position along a top surface of the seat base.

In illustrative embodiments, the backrest lock includes an armrest and an armrest anchor. The armrest is mounted for movement on the seat base between an upright backrest-blocking position providing a barrier to forward-folding movement of the backrest toward a seat bottom included in the seat base and a retracted backrest-releasing position extending away from the seat bottom and removing an armrest barrier to forward-folding movement of the backrest. In illustrative embodiments, the juvenile vehicle seat includes two backrest locks and each backrest lock includes a pivotable armrest and a companion armrest anchor.

A caregiver can operate the armrest anchor to release the companion armrest to allow pivoting movement of the foldable backrest relative to the seat base. Once the armrest is released and pivoted to a backrest-releasing retracted position, the caregiver can pivot the foldable backrest about a pivot axis relative to the seat base toward the compact folded storage position.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a partial perspective view of a juvenile vehicle seat in accordance with the present disclosure including a foldable backrest included in a seat back, a stationary seat base, and a first armrest mounted on the seat base for pivotable movement between an upright backrest-blocking position (see also FIG. 2) providing a barrier to forward-folding movement of the foldable backrest toward a seat bottom included in the seat base and a retracted backrest-releasing position (see FIG. 4) extending away from the seat bottom and removing an armrest barrier to forward-folding movement of the foldable backrest and showing diagrammatically inclusion in the juvenile vehicle seat of a first backrest lock comprising the first armrest and a first armrest anchor and a second backrest lock comprising a second armrest and a second armrest anchor;

FIG. 7 is a perspective view of an illustrative compactible juvenile vehicle seat in accordance with the present disclosure, the illustrative juvenile vehicle seat adapted and suited to include armrests and armrest anchors of the type shown in FIGS. 1-4, showing a foldable backrest retained in an upright use position by a U-shaped backrest frame including first and second legs (shown in phantom) and an exposed style bar (shown in solid) arranged to interconnect upper ends of the first and second legs and lie above the foldable backrest and also showing an illustrative frame anchor (shown partly in solid and partly in phantom) coupled to the style bar and each of the first and second legs and configured to assume a locked state retaining the first and second legs in mated relation to a frame receiver included in the seat base;

DETAILED DESCRIPTION

Figure 1:
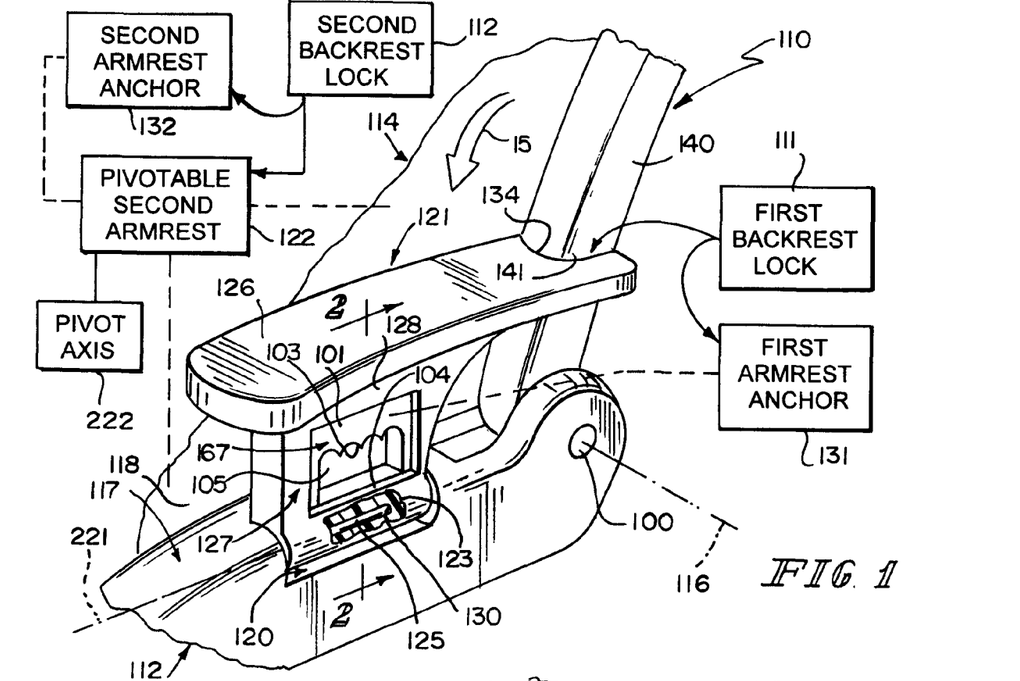
FIG. 1a is a view similar to FIG. 1 showing the first armrest after it has been moved outwardly about a pivot axis to assume the retracted backrest-releasing position so that the foldable backrest can be folded in a forward direction.
FIG. 1b is an exploded perspective assembly view of the components shown in FIG. 1 suggesting that the first armrest includes (from top to bottom) an arm support pad, a latch-biasing spring, a latch unit, a pad base, and a pivot rod and showing an upwardly opening arm-receiver channel formed in the seat base and sized to receive a somewhat cylinder-shaped lower end of the pad base.
Figure 4:
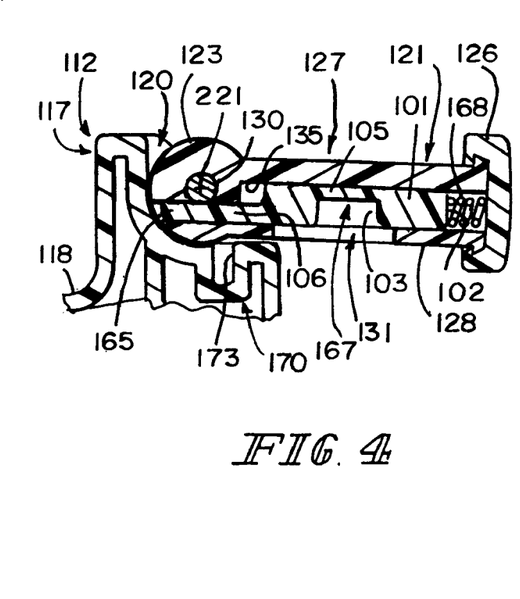
FIG. 4 is a sectional view similar to FIGS. 2 and 3 showing pivoted movement of the first armrest about the pivot axis in an arm-receiver channel provided in the seat base to assume the retracted backrest-releasing position.

A juvenile vehicle seat 110 includes a seat base 112, a pivotable first armrest 121 coupled to seat base 112 to pivot about a pivot axis 221, and a foldable backrest 140 included in a seat back 114 and coupled to seat base 112 using an axle 100 to pivot about a pivot axis 116 as suggested in FIG. 1. Foldable backrest 140 is retained normally in an upright use position as shown in FIG. 1 by a first backrest lock 111 including first armrest 121 and a first armrest anchor 131. Manual operation of first armrest anchor 131 to free first armrest 121 to move from an upright backrest-blocking position shown in FIGS. 1 and 2 to a retracted backrest-releasing position shown in FIG. 4 is suggested in FIGS. 2-4.

In an illustrative embodiment, seat 110 also includes a pivotable second armrest 122 and a second armrest anchor 132 that cooperate to form a second backrest lock 112 as suggested diagrammatically in FIG. 1. Second armrest 122 is coupled to seat base 112 to pivot about a pivot axis 222 in a manner similar to pivotable first armrest 121. First and second backrest locks 111, 112 cooperate to provide means for releasably retaining foldable backrest 140 in the upright use position shown in FIG. 1.

Figure 1A:
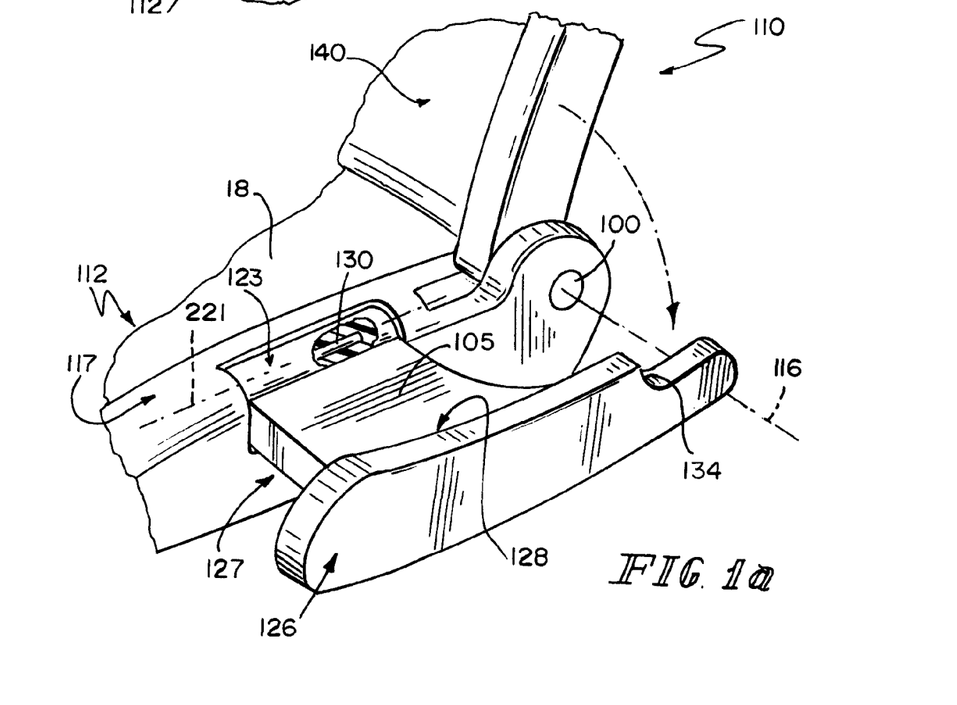

Foldable backrest 140 can fold about pivot axis 116 toward seat base 112 in forward direction 15 (see FIG. 1) to assume a compact folded storage position (similar to the position of backrest 40 shown in FIG. 8) on seat base 112 in response to (1) release of first and second armrest anchors 131, 132 to free first and second armrests 121, 122 for pivotable movement about pivot axes 221, 222 and then (2) pivoting movement of first and second armrests 121, 122 away from one another about pivot axes 221, 222. Such pivoting movement removes backrest-folding barriers established by first and second armrests 121, 122 in their upright backrest-blocking positions. An axle 100 is provided as suggested in FIG. 1b and coupled to seat base 112 and foldable backrest 140 as suggested in FIGS. 1, 1a, and 1b to establish pivot axis 116.

As suggested in FIG. 1, seat base 112 is formed to include a seat bottom 118 located between a left thigh-support rim 117 and a right thigh-support rim 119. Each rim 117, 119 is formed to include an arm-receiver channel 120 sized to receive a lower end 123 of a companion armrest therein and to allow movement of the companion armrest relative to seat base 112 in an outward direction between an upright backrest-blocking position shown, for example, in FIGS. 1 and 2 and a retracted backrest-releasing position away from seat bottom 118 as suggested in FIG. 4. It is within the scope of this disclosure to vary the height, width, and shape of rims 117, 119 as needed.

Figure 2:
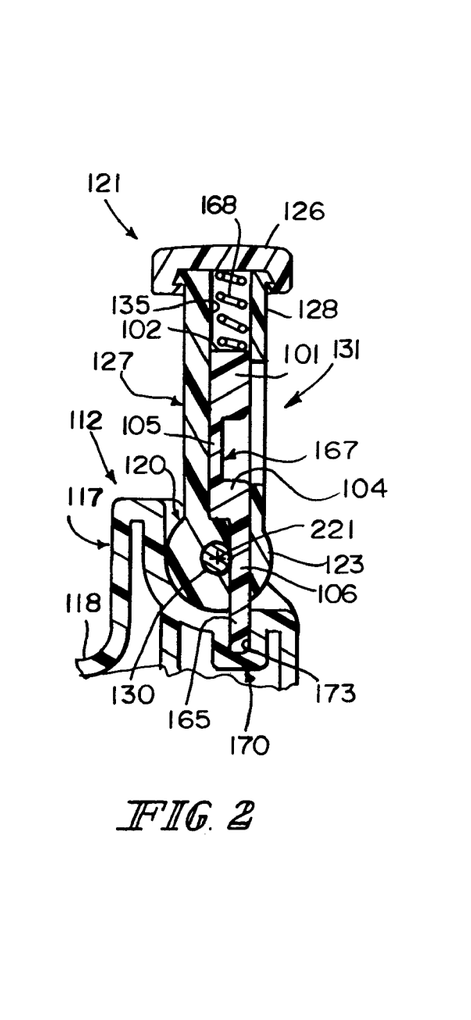
FIG. 2 is an enlarged sectional view taken along line 2-2 of FIG. 1 showing a spring-biased slidable latch urged downwardly in an interior channel formed in the first armrest to mate with a latch receiver formed in the seat base to establish an illustrative first armrest anchor.

As suggested in FIGS. 1 and 2, first armrest 121 includes an arm support pad 126 and a pad base 127 arranged to extend downwardly away from pad 126. Pad base 127 includes an upper distal end 128 coupled to an underside of pad 126 as suggested in FIG. 2 and a proximal lower end 123 sized to fit into and move in arm-receiver channel 120 formed in seat base 112 as suggested in FIGS. 1 and 2. In an illustrative embodiment, the arm-receiver channel 120 associated with first armrest 121 is formed or otherwise provided in first rim 117.

Lower end 123 of pad base 127 is formed to include a rod-receiving channel 125 extending along pivot axis 221 and sized to receive pivot rod 130 therein as suggested in FIGS. 1 and 2. Pivot rod 130, pad base 127, and arm support pad 126 cooperate in an illustrative embodiment to form a movable frame configured to move relative to seat base 112 and, illustratively, to pivot about pivot axis 221. Pivot rod 130 is also configured to extend into opposing rod-receiver apertures 201, 202 formed in seat base 112 and opening into arm-receiver channel 120 to mate with seat base 112 and first armrest 121 to establish first pivot axis 221. Second armrest 122 is similar in shape, components, and function to first armrest 121 and is mounted on second thigh-support rim 119 to pivot about second pivot axis 222.

As suggested in FIG. 1, arm support pad 126 is formed to include a rearwardly facing, concave, curved backrest-blocker wall 134. Backrest-blocker wall 134 is configured to mate with or lie in closely confronting relation to a blocking portion 141 of a foldable backrest 140 included in seat back 114 to block forward-folding movement of backrest 140 in direction 15 from the upright use position shown in FIG. 1 to a compact folded storage position resting on or above seat bottom 118 of seat base 112 as long as first armrest 121 remains in the upright backrest-blocking position shown, for example, in FIGS. 1 and 2.

Figure 3:
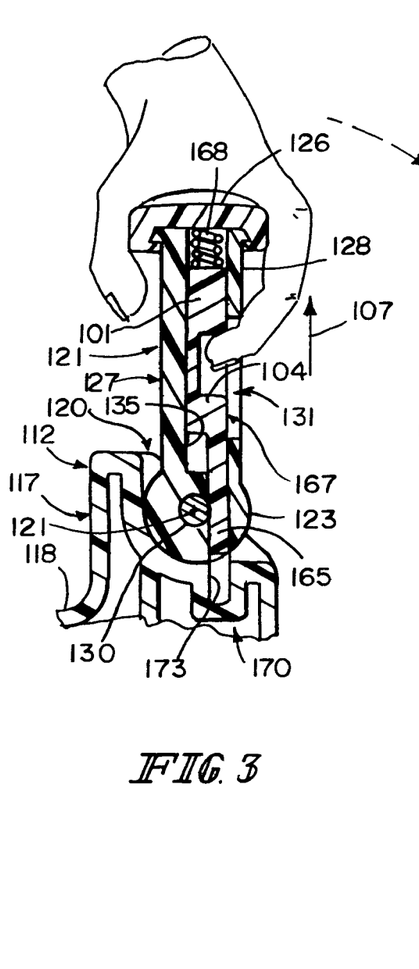
FIG. 3 is a sectional view similar to FIG. 2 showing a user gripping an arm support pad included in the first armrest and a finger grip provided in the slidable latch and moving the slidable latch upwardly in the interior channel formed in the first armrest to compress the latch-biasing spring and to withdraw a catch provided in a lower end of the latch from the latch receiver formed in the seat base so that the first armrest is free to pivot about a pivot axis in a counterclockwise direction toward a retracted backrest-releasing position shown, for example, in FIG. 4.

An illustrative embodiment of first armrest anchor 131 is provided in FIGS. 2-4. Second armrest anchor 132 has a similar construction in an illustrative embodiment.

First armrest anchor 131 includes a slidable latch 167 mounted for reciprocating and sliding movement in an interior channel 135 formed in pad base 127 as suggested in FIGS. 2 and 3. Slidable latch 167 is movable in interior channel 135 between a locked position (shown in FIG. 2) mating with seat base 112 and an unlocked position (shown in FIGS. 3 and 4) separating from seat base 112. First armrest anchor 131 also includes a latch-biasing spring 168 coupled to first armrest 121 and latch 167 and constrained normally and yieldably to urge latch 167 in interior channel 135 to assume the locked position whenever first armrest 121 is moved to assume the upright use position as suggested in FIG. 2.

Figure 1B:
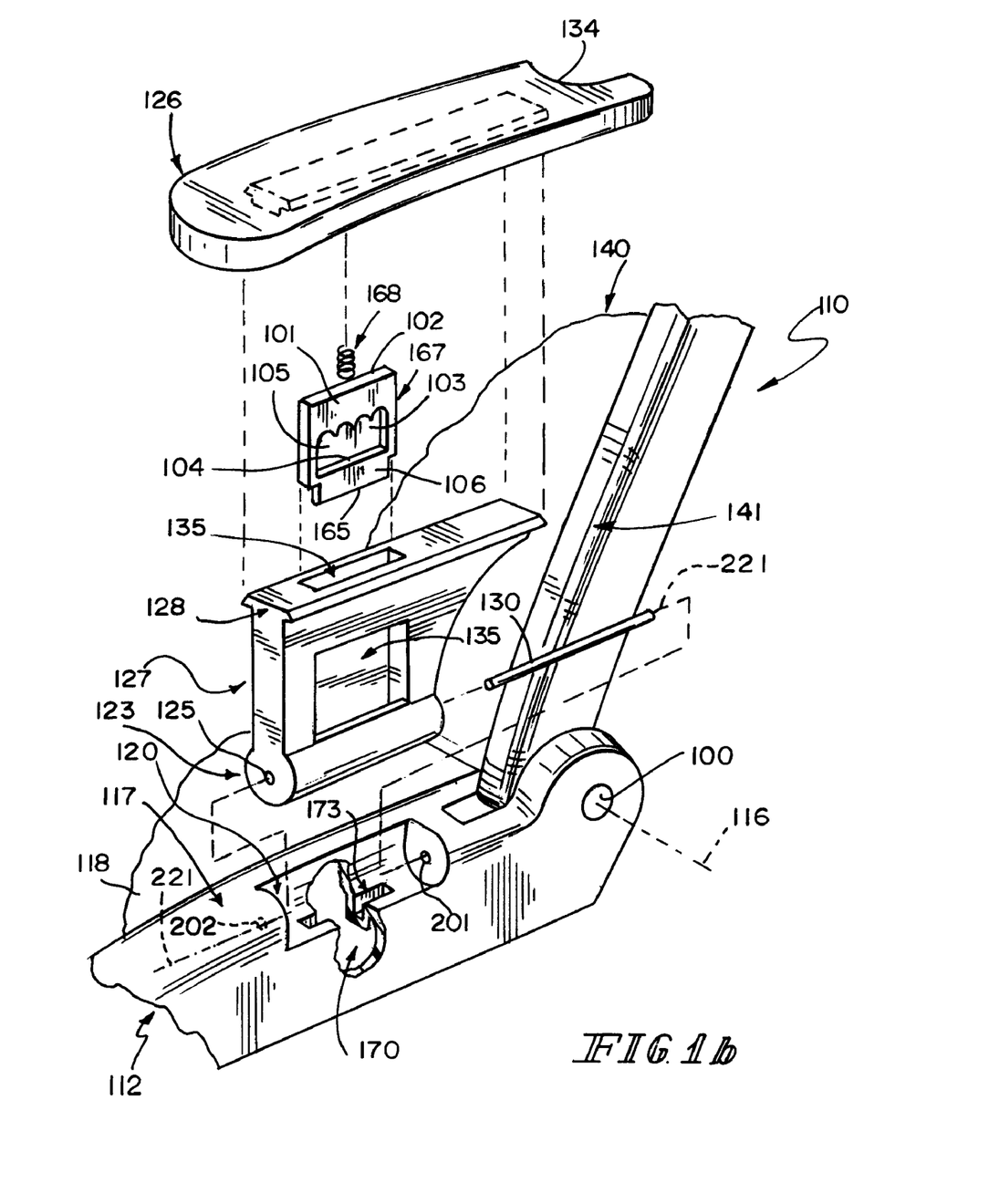

As shown best in FIG. 1b and in FIGS. 1-4, latch 167 is a monolithic element comprising an upper block 101 having a topside 102 engaging latch-biasing spring 168 and a bottom side formed to provide a finger grip 103. Latch 167 includes a stopper 104, an upper plate 105 interconnecting upper block 101 and stopper 104, and a lower plate 106 cantilevered to stopper 104 and extending downwardly therefrom to provide a catch 165 on a distal portion thereof.

As suggested in FIGS. 2-4, first armrest anchor 131 also includes a latch retainer 170 coupled to first thigh-support rim 117 of seat base 112. Latch retainer 170 is formed to include an upwardly opening latch receiver 173 sized to receive catch 165 of latch 167 therein upon movement of latch 167 to the locked position.

Once foldable backrest 140 is pivoted about pivot axis 116 to assume an upright use position relative to seat base 112, first armrest 121 can be pivoted about pivot axis 221 toward seat bottom 118 to assume an upright backrest-blocking position shown in FIG. 1. In this upright backrest-blocking position, first armrest 121 is arranged to lie alongside seat back 114 to cause concave, curved backrest-blocker wall 134 to lie in closely confronting relation to a curved exterior surface 141 of foldable backrest 140 as shown, for example, in FIG. 1. Latch 167 is moved automatically by latch-biasing spring 168 to place catch 165 in latch receiver 173 of latch retainer 170 as suggested in FIG. 2 to lock first armrest 121 to seat base 112 to block forward-folding movement of foldable backrest 140 in direction 15. (Second armrest 122 and second armrest anchor 132 cooperate to assist in retaining foldable backrest 140 in a locked upright orientation in a similar manner.)

To release (or unlock) upright foldable backrest 140 so that it can be folded in direction 15 toward seat bottom 118 to assume a compact folded storage position on seat bottom 118, a user grips arm support pad 126 and lifts latch 167 upwardly in direction 107 relative to pad base 127 to compress latch-biasing spring 168 and disengage catch 165 from latch receiver 173 of latch retainer 170 as suggested in FIG. 3. Now, first armrest 121 is free to be pivoted about first pivot axis 221 relative to seat bottom 118 of seat base 112 to assume the retracted backrest-releasing position shown in FIGS. 1a and 4.

Figure 5:
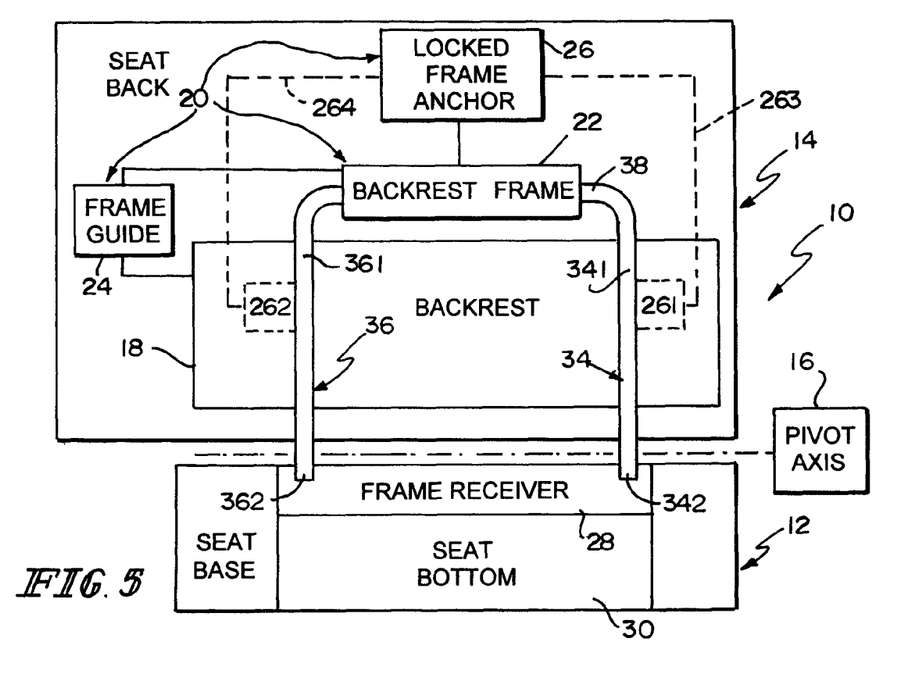
FIG. 5 is a diagrammatic view of a juvenile vehicle seat in accordance with another embodiment of the present disclosure showing a seat base including a seat bottom, an axle, and a frame receiver and a seat back including a foldable backrest mounted on the axle for folding movement about a pivot axis, a backrest frame mounted for movement relative to the foldable backrest and formed to include two legs, and a frame anchor and showing the frame anchor in a locked state wherein the backrest frame lies in a backrest-locking position mating the two backrest frame legs with the frame receiver in the seat base to retain the foldable backrest in an upright use position relative to the stationary seat base.
Figure 6:
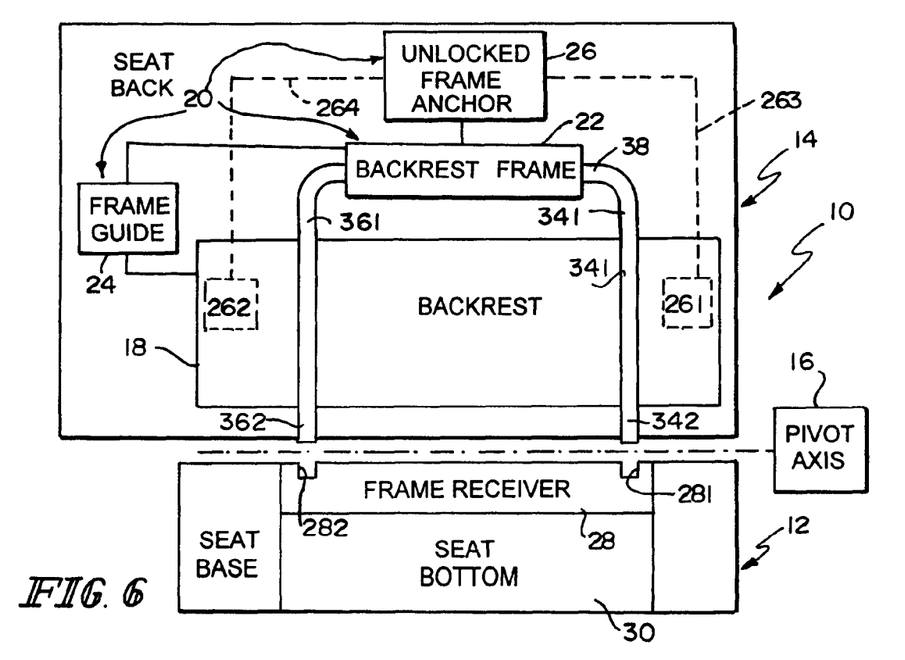
FIG. 6 is a view similar to FIG. 5 showing the frame anchor in an unlocked state and movement of the backrest frame relative to the upright backrest to a backrest-releasing position unmating the two backrest frame legs from the frame receiver in the seat base to release the upright backrest so that it is free to pivot about the pivot axis relative to the seat base to assume a compact folded storage position.
Figure 7:
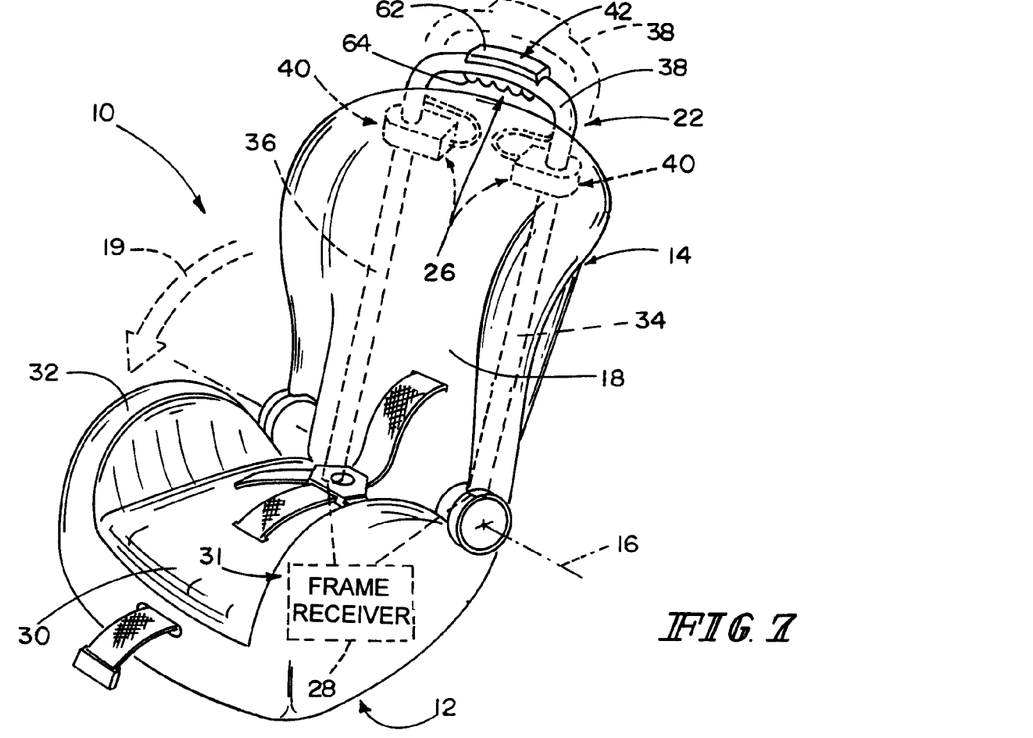

A juvenile vehicle seat 10 in accordance with another embodiment of the present disclosure includes a seat base 12 and a foldable backrest seat back 14 coupled to seat base 12 at a pivot axis 16 as suggested diagrammatically in FIG. 5 and illustratively in FIG. 7. Seat back 14 includes a foldable backrest 18 and a backrest lock 20 configured normally to retain foldable backrest 18 in an upright use position shown diagrammatically in FIG. 5 and illustratively in FIGS. 7 and 9. Backrest lock 20 can be operated manually by a caregiver as suggested diagrammatically in FIG. 6 and illustratively in FIG. 10 to free foldable backrest 18 so that, once freed, it can be pivoted about pivot axis 16 as suggested in FIG. 11 to assume a compact folded storage position shown, for example, in FIGS. 8 and 12.

As suggested in FIG. 5, backrest lock 20 includes a backrest frame 22, a frame guide 24, and a frame anchor 26. Seat base 12 is formed to include a frame receiver 28 associated with backrest frame 22 and a seat bottom 30 coupled to frame receiver 28 as suggested in FIG. 5 and adapted to support a juvenile (not shown) seated in juvenile vehicle seat 10. It is within the scope of the present disclosure to incorporate first and second armrests 121. 122 and first and second armrest anchors 131, 132 into juvenile vehicle seat 10 to provide auxiliary means for locking seat back 14 to retain foldable backrest 18 in the upright use position.

Frame guide 24 is coupled to foldable backrest 18 and configured to support backrest frame 22 for movement relative to foldable backrest 18 and to seat base 12 between a backrest-locking position mating with frame receiver 28 included in seat base 12 as suggested in FIG. 5 and a backrest-releasing position not mating with frame receiver 28 as suggested in FIG. 6. Foldable backrest 18 is retained in the upright use position as suggested in FIG. 5 when backrest frame 22 has been moved to the backrest-locking position mating with frame receiver 28 in seat base 12. Frame anchor 26 is provided normally to anchor backrest frame 22 in the backrest-locking position whenever foldable backrest 18 lies in the upright use position as shown in FIG. 5.

Frame anchor 26 is configured to be operated manually by a caregiver as suggested in FIG. 6 to free backrest frame 22 so that it can be moved relative to foldable backrest 18 to disengage frame receiver 28 provided in seat base 12. Once freed, foldable backrest 18 can be pivoted by a caregiver about pivot axis 16 in, for example, a direction toward seat bottom 30 to assume a compact folded storage position.

As suggested diagrammatically in FIG. 5, frame anchor 26 is coupled to backrest frame 22 to move therewith relative to foldable backrest 18 and is also coupled to foldable backrest 18. Frame anchor 26 is configured to provide lock means (represented diagrammatically by phantom boxes 261 and 262 in FIGS. 5 and 6) for anchoring backrest frame 22 in a fixed position relative to foldable backrest 18 when foldable backrest 18 lies in an upright use position relative to seat base 12 and when backrest frame 22 mates with frame receiver 28 included in seat base 12. Frame anchor 26 is also configured to provide actuator means (represented by phantom lines 263, 264 in FIGS. 5 and 6) for disabling lock means 261, 262 at the option of a caregiver to allow the caregiver to unmate backrest frame 22 from frame receiver 28 to free foldable backrest 18 for movement relative to seat base 12 to assume a compact folded storage position. In an illustrative embodiment, lock means 261, 262 is coupled to foldable backrest 18 to move therewith and the actuator means 263, 264 is coupled to backrest frame 22 to move therewith and also to lock means 261, 262.

Figure 8:
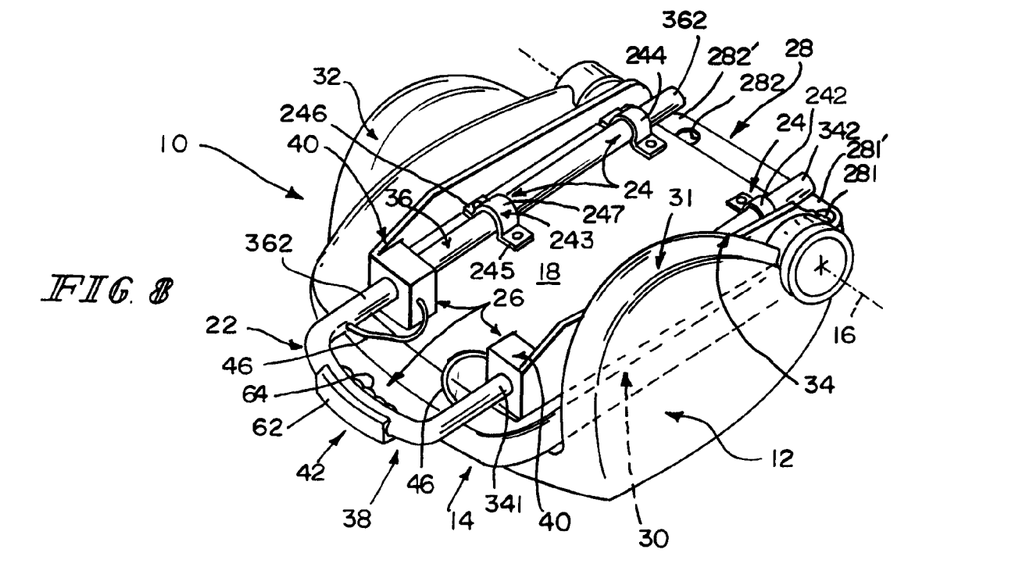
FIG. 8 is a perspective view similar to FIG. 7 after manual release of the frame anchor by a caregiver in a manner suggested in FIGS. 9 and 10 and forward pivoting movement of the foldable backrest relative to the seat base about a pivot axis to assume a compact folded storage position in a manner suggested, for example, in FIGS. 11 and 12 and showing removal of lower ends of each of the first and second legs from leg-receiving sockets formed in the frame receiver coupled to a rear portion of a seat bottom included in the seat base.

An illustrative example of juvenile vehicle seat 10 is shown in FIGS. 7-11. Seat base 12 includes first and second thigh-support rims 31, 32 and seat bottom 30 is arranged to lie between and below first and second thigh-support rims 31, 32, as suggested in FIG. 7. As shown in FIG. 8, frame receiver 25 has a first end 281' located behind first thigh-support rim 31 and an opposite second end 282' located behind second thigh-support rim 32. Foldable backrest 18 is arranged to lie above seat bottom 30 and in a space provided between first and second thigh-support rims 31, 32 when foldable backrest 18 is moved in counterclockwise direction 19 as suggested in FIG. 7 to assume the compact folded storage position as suggested in FIG. 8. Seat base 12 also includes a pivotable kickstand 33 arranged as shown to support seat bottom 30 on an underlying surface 35 provided by, for example, a vehicle seat or a storage shelf or suggested in FIGS. 9 and 12.

Backrest frame 22 is a U-shaped tubular member in the illustrative embodiment shown in FIGS. 7-11. Backrest frame 22 includes first and second legs 34, 36 arranged to lie in spaced-apart parallel relation to one another and a style bar 38 arranged to interconnect upper end 341 of first leg 34 and upper end 361 of second leg 36 as suggested in FIGS. 7 and 8. First leg 34 also includes an opposite, distal, lower end 342 arranged to mate with frame receiver 28 as suggested in FIGS. 8 and 9. Second leg 36 also includes an opposite, distal, lower end 362 arranged to mate with frame receiver 28 as suggested in FIG. 8.

Figure 9:
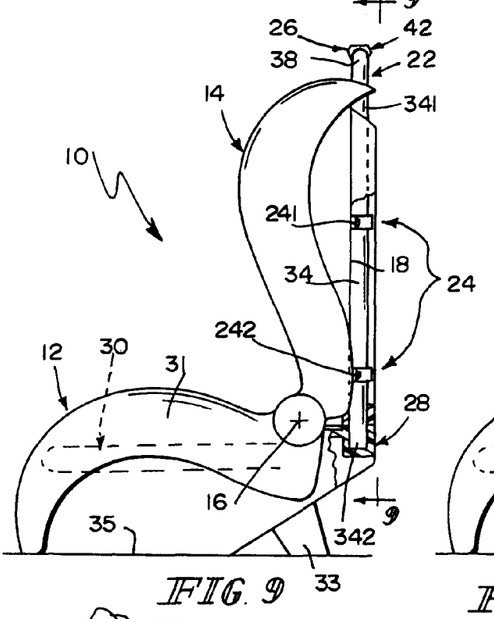
FIG. 9 is a side elevation view of the juvenile vehicle seat of FIGS. 7 and 8 with portions of the seat base and back removed to show insertion of a lower end of the first leg of the backrest frame into a companion first leg-receiving socket formed in the frame receiver of the seat base to retain the backrest in the upright use position relative to the stationary seat base.

Frame guide 24 includes separate upper and lower leg guides 241, 242 for first leg 34 of backrest frame 22 and separate upper and lower leg guides 243, 244 for second leg 36 of backrest frame 22 as suggested, for example in FIGS. 8 and 9. Each of leg guides 241-244 includes first and second flanges 245, 246 coupled to a rear surface of foldable backrest 18 and a curved link 247 arranged to interconnect companion first and second flanges 245, 246 (as suggested in FIG. 8) and cooperate with foldable backrest 18 to form a leg-receiving space located therebetween and sized to receive one of legs 34, 36 therein (as suggested in FIG. 8) and allow sliding movement of such leg back and forth therein during movement of backrest frame 22 relative to foldable backrest 18 (as suggested in FIG. 8).

Figure 10:
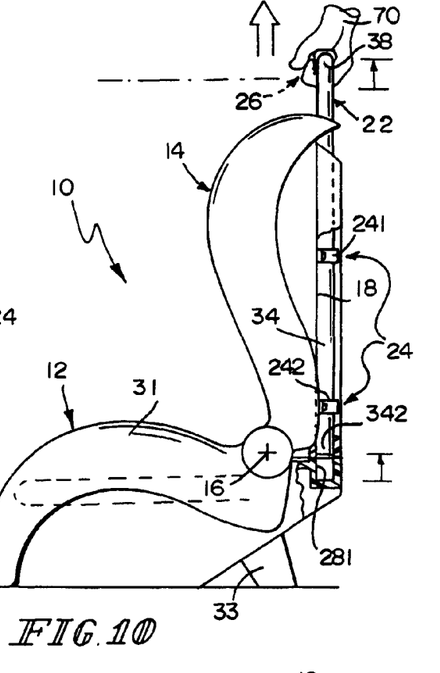
FIG. 10 is a side elevation view similar to FIG. 9 showing upward movement of the unlocked backrest frame in response to a lifting force applied to the style bar of the backrest frame by a caregiver to withdraw the lower end of the first leg of the backrest frame from the companion first leg-receiving socket formed in the frame receiver of the seat base to release the foldable backrest so that it is free to move to the compact folded storage position as shown in FIGS. 11 and 12.
Figures 11, 12:
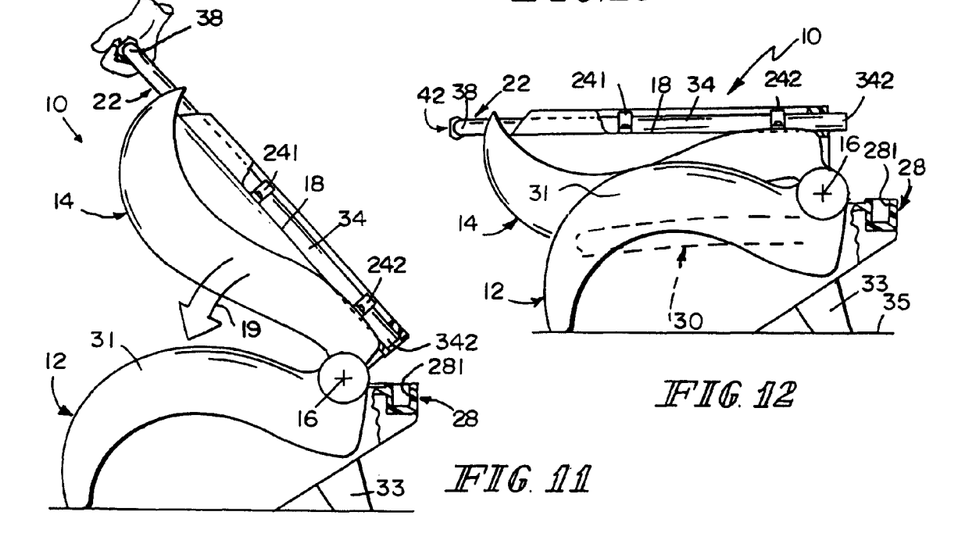
FIG. 11 is a side elevation view similar to FIGS. 9 and 10 showing counterclockwise (forward) pivoting motion of the foldable backrest about the pivot axis toward the compact folded storage position.
FIG. 12 is a side elevation view similar to FIGS. 9-11 showing the foldable backrest in an illustrative compact folded storage position that is also shown in FIG. 8.

Frame receiver 28 is formed to include a first leg-receiving socket 281 sized to receive lower end 342 of first leg 34 therein as suggested in FIGS. 9-11 when backrest frame 22 is mated to frame receiver 28 to establish the backrest-locking position. Frame receiver 28 is also formed to include a second leg-receiving socket 282 sized to receive lower end 362 of second leg 36 therein as suggested in FIG. 8 when backrest frame 22 is mated to frame receiver 28 to establish the backrest-locking position. It is within the scope of the present disclosure to incorporate first and second armrests 121, 122 and first and second armrest anchors 131, 132 into juvenile vehicle seat 10 shown in FIGS. 7-12 to provide auxiliary means for locking seat back 14 to retain foldable backrest 18 in the upright use position.

The invention claimed is:

1. A compactible juvenile vehicle seat comprising
a seat base adapted to set on a vehicle seat and formed to include a seat bottom adapted to support a juvenile in a seated position and an axle associated with the seat bottom,
a foldable backrest mounted on the axle for folding movement between an upright use position arranged to extend upwardly away from the seat bottom and adapted to support a juvenile in the seated position on the seat bottom and a compact folded storage position arranged to extend along the seat bottom and lie in confronting relation to the seat bottom,
a first backrest lock configured to provide means for retaining the foldable backrest in the upright use position and for releasing the foldable backrest to free the foldable backrest so that, once freed, the foldable backrest can be pivoted about a pivot axis established by the axle to assume the compact folded storage position, wherein the first backrest lock includes a first armrest and a first armrest anchor, the first armrest is mounted to the seat base for movement relative to the seat bottom between an upright backrest-blocking position arranged to lie in confronting relation to the foldable backrest to block forward pivoting movement of the foldable backrest on the axle from the upright use position toward the seat bottom and a retracted backrest-releasing position to free the foldable backrest to pivot on the axle about the pivot axis between the upright use position and the compact folded storage position, and the first armrest anchor includes a latch retainer coupled to the seat base and latch means coupled to the first armrest tar releasably mating, with the latch retainer upon movement of the first armrest to the upright backrest-blocking position and the foldable backrest to the upright use position to retain the foldable backrest in the upright use position, and
wherein the seat base includes two spaced-apart thigh-support rims and the seat bottom is located between the thigh-support rims and adapted to seat a juvenile thereon and a first of the thigh-support rims is formed to include a first arm-receiver channel, and a lower end of the first armrest is arranged to extend into the first arm-receiver channel and configured to mate with a first pivot rod included in the first armrest and located in the first arm-receiver channel and coupled to the first of the thigh-support rims, and the first pivot rod provides means for supporting the first armrest for pivotable movement about a pivot axis established by the first pivot rod during movement of the first armrest between the backrest-blocking and backrest-releasing positions.

2. The compactible juvenile vehicle seat of claim 1, wherein the first armrest further includes a pad base including the lower end and a distal upper end, an arm support pad coupled to the distal upper end of the pad base, and wherein the arm support pad includes a backrest-blocker wall arranged to mate with a blocking portion of the foldable backrest upon movement of the foldable backrest to the upright use position and the first armrest to the upright backrest-blocking position to block forward folding movement of the foldable backrest from the upright use position toward the compact folded storage position.

3. A compactible juvenile vehicle seat comprising
a seat base adapted to set on a vehicle seat and formed to include a seat bottom adapted to support a juvenile in a seated position and an axle associated with the seat bottom,
a foldable backrest mounted on the axle for folding movement between an upright use position arranged to extend upward away from the seat bottom and adapted to support a juvenile in the seated position on the seat bottom and a compact folded storage position arranged to extend along the seat bottom and lie in confronting relation to the seat bottom,
a first backrest lock configured to provide means for retaining the foldable backrest in the upright use position and for releasing the foldable backrest to free the foldable backrest so that, once freed, the foldable backrest can be pivoted about a pivot axis established by the axle to assume the compact folded storage position, wherein the first backrest lock includes a first armrest and a first armrest anchor, the first armrest is mounted to the seat base for movement relative to the seat bottom between an upright backrest-blocking position arranged to lie in confronting relation to the foldable backrest to block forward pivoting movement of the foldable backrest on the axle from the upright use position toward the seat bottom and a retracted backrest-releasing position to free the foldable backrest to pivot on the axle about the pivot axis between the upright use position and the compact folded storage position, and the first armrest anchor includes a latch retainer coupled to the seat base and latch means coupled to the first armrest for releasably mating with the latch retainer upon movement of the first armrest to the upright backrest-blocking position and the foldable backrest to the upright use position to retain the foldable backrest in the upright use position,
wherein the seat base includes first and second rims arranged to lie in spaced-apart relation to one another and the seat bottom is arranged to lie between the first and second rims and under the foldable backrest upon movement of the foldable backrest to assume the compact folded storage position and wherein the latch retainer is coupled to the first rim, and
wherein the latch retainer is elongated and arranged to extend along and below a pivot axis established by a pivot rod included in the first armrest and coupled to the first rim to support the first armrest for pivotable movement relative to the seat base about the pivot axis between the backrest-blocking position and the backrest-releasing position.

4. The compactible juvenile vehicle seat of claim 3, wherein the latch retainer is formed to include an upwardly opening latch receiver sized to receive a catch included in the latch means upon movement of the first armrest to the backrest-blocking position to mate the first armrest to the seat base.

5. The compactible juvenile vehicle seat of claim 3, wherein the latch retainer has a U-shaped cross section.

6. The compactible juvenile vehicle seat of claim 3, wherein the foldable backrest includes a front surface adapted to face toward a juvenile resting in the seated position on the seat bottom and an oppositely facing rear surface, the front surface is arranged to lie in confronting relation to the seat bottom upon movement of the foldable backrest to the compact folded storage position, and the latch retainer is arranged to lie in a space located between an edge of the foldable backrest extending between the front surface and the oppositely facing rear surface and an outer side wall of the seat base upon movement of the foldable backrest to the compact folded storage position.

7. A compactible juvenile vehicle seat comprising a seat base adapted to set on a vehicle seat and formed to include a seat bottom adapted to support a juvenile in a seated position and an axle associated with the seat bottom, a foldable backrest mounted on the axle for folding movement between an upright use position arranged to extend upwardly away from the seat bottom and adapted to support a juvenile in the seated position on the seat bottom and a compact folded storage position arranged to extend along the seat bottom and lie in confronting relation to the seat bottom, a first backrest lock configured to provide means for retaining the foldable backrest in the upright use position and for releasing the foldable backrest to free the foldable backrest so that, once freed, the foldable backrest can be pivoted about a pivot axis established b the axle to assume the compact folded storage position, wherein the first backrest lock includes a first armrest and a first armrest anchor, the first armrest is mounted to the seat base for movement relative to the seat bottom between an upright backrest-blocking position arranged to lie in confronting relation to the foldable backrest to block forward pivoting movement of the foldable backrest on the axle from the upright use position toward the seat bottom and a retracted backrest-releasing position to free the foldable backrest to pivot on the axle about the pivot axis between the upright use position and the compact folded storage position, and the first armrest anchor includes a latch retainer coupled to the seat base and latch means coupled to the first armrest for releasably mating with the latch retainer upon movement of the first armrest to the upright backrest-blocking position and the foldable backrest to the upright use position to retain the foldable backrest in the upright use position, wherein the seat base includes first and second rims arranged to lie in spaced-apart relation to one another and the seat bottom is arranged to lie between the first and second rims and under the foldable backrest upon movement of the foldable backrest to assume the compact folded storage position and wherein the latch retainer is coupled to the first rim, and wherein the first rim is formed to include an arm-receiver channel and a lower end of the first armrest is arranged to extend into the arm-receiver channel and move therein during movement of the first armrest between the backrest-blocking position and the backrest-releasing position.

8. The compactible juvenile vehicle seat of claim 7, wherein the first armrest further includes a pivot rod coupled to the first rim and arranged to extend through the arm-receiver channel to establish a pivot axis about which the first armrest rotates as the first armrest moves between the backrest-blocking position and the backrest-releasing position.

9. A compactible juvenile vehicle seat comprising a seat base adapted to set on a vehicle seat and formed to include a seat bottom adapted to support a juvenile in a seated position and an axle associated with the seat bottom, a foldable backrest mounted on the axle for folding movement between an upright use position arranged to extend upwardly away from the seat bottom and adapted to support a juvenile in the seated position on the seat bottom and a compact folded storage position arranged to extend along the seat bottom and lie in confronting relation to the seat bottom, a first backrest lock configured to provide means for retaining the foldable backrest in the upright use position and for releasing the foldable backrest to free the foldable backrest so that, once freed, the foldable backrest can be pivoted about a pivot axis established by the axle to assume the compact folded storage position, wherein the first backrest lock includes a first armrest and a first armrest anchor, the first armrest is mounted to the seat base for movement relative to the seat bottom between an upright backrest-blocking position arranged to lie in confronting relation to the foldable backrest to block forward pivoting movement of the foldable backrest on the axle from the upright use position toward the seat bottom and a retracted backrest-releasing position to free the foldable backrest to pivot on the axle about the pivot axis between the upright use position and the compact folded storage position and the first armrest anchor includes a latch retainer coupled to the seat base and latch means coupled to the first armrest for releasably mating with the latch retainer upon movement of the first armrest to the upright backrest-blocking position and the foldable backrest to the upright use position to retain the foldable backrest in the upright use position, and wherein the first armrest includes an arm support pad formed to include a backrest-blocker wall arranged to mate with a blocking portion of the foldable backrest upon movement of the foldable backrest to the upright use position and the first armrest to the upright backrest-blocking position to block forward folding movement of the foldable backrest from the upright use position toward the compact folded storage position and an anchor mount coupled to the arm support pad and formed to include an interior channel receiving portions of the first armrest anchor therein.

10. A compactible juvenile vehicle seat comprising a seat base adapted to set on a vehicle seat and firmed to include a seat bottom adapted to support a juvenile in a seated position and an axle associated with the seat bottom, a foldable backrest mounted on the axle for folding movement between an upright use position arranged to extend upwardly away from the seat bottom and adapted to support a juvenile in the seated position on the seat bottom and a compact folded storage position arranged to extend along the seat bottom and lie in confronting relation to the seat bottom, a first backrest lock configured to provide means for retaining the foldable backrest in the upright use position and for releasing the foldable backrest to free the foldable backrest so that, once freed, the foldable backrest can be pivoted about a pivot axis established by the axle to assume the compact folded storage position, wherein the first backrest lock includes a first armrest and a first armrest anchor, the first armrest is mounted to the seat base for movement relative to the seat bottom between an upright backrest-blocking position arranged to lie in confronting relation to the foldable backrest to block forward pivoting movement of the foldable backrest on the axle from the upright use position toward the seat bottom and a retracted backrest-releasing position to free the foldable backrest to pivot on the axle about the pivot axis between the upright use position and the compact folded storage position, and the first armrest anchor includes a latch retainer coupled to the seat base and latch means coupled to the first armrest for releasably mating with the latch retainer upon movement of the first armrest to the upright backrest-blocking position and the foldable backrest to the upright use position to retain the foldable backrest in the upright use position, wherein the latch retainer is formed to include a latch receiver and the latch means includes a catch arranged to extend into the latch receiver upon movement of the first armrest to the backrest-blocking position and to lie outside of the latch receiver when the first armrest occupies the backrest-releasing position, the latch means further includes a movable frame configured to pivot about a pivot axis during movement of the first armrest between the upright backrest-blocking position and the retracted backrest-releasing position and the first armrest anchor is coupled to the movable frame to move therewith, and wherein the movable frame includes a pad base having a lower end and a distal upper end, an arm pivot rod coupled to the lower end of the pad base and to the seat base to establish a pivot axis, and the first armrest pivots about the pivot axis as the first armrest is moved between the upright backrest-blocking position and the retracted backrest-releasing position, and an arm support pad coupled to the distal upper end of the pad base.

11. The compactible juvenile vehicle seat of claim 10, wherein the latch means further includes a slidable latch mounted to reciprocate and slide in an interior channel formed in the pad base between a locked position extending the catch into the latch receiver and an unlocked position withdrawing the catch from the latch receiver.

12. The compactible juvenile vehicle seat of claim 11, wherein the latch means further includes a latch-biasing spring coupled to the first armrest and to the latch and constrained normally and yieldably to urge the latch in the interior channel to assume the locked position whenever the first armrest is moved to assume the upright use position.

13. A compactible juvenile vehicle seat comprising a seat base adapted to set on a vehicle seat and formed to include a seat bottom adapted to support a juvenile in a seated position and an axle associated with the seat bottom, a foldable backrest mounted on the axle for folding movement between an upright use position arranged to extend upwardly away from the seat bottom and adapted to support a juvenile in the seated position on the seat bottom and a compact folded storage position arranged to extend along the seat bottom and lie in confronting relation to the seat bottom, a first backrest lock configured to provide means for retaining the foldable backrest in the upright use position and for releasing the foldable backrest to free the foldable backrest so that once freed the foldable backrest can be voted about a pivot axis established by the axle to assume the compact folded storage position, wherein the first backrest lock includes a first armrest and a first armrest anchor, the first armrest is mounted to the seat base for movement relative to the seat bottom between an upright backrest-blocking position arranged to lie in confronting relation to the foldable backrest to block forward pivoting movement of the foldable backrest on the axle from the upright use position toward the seat bottom and a retracted backrest-releasing position to free the foldable backrest to pivot on the axle about the pivot axis between the upright use position and the compact folded storage position, and the first armrest anchor includes a latch retainer coupled to the seat base and latch means coupled to the first armrest for releasably mating with the latch retainer upon movement of the first armrest to the upright backrest-blocking position and the foldable backrest to the upright use position to retain the foldable backrest in the upright use position, wherein the first armrest includes a backrest-blocker wall arranged to mate with a blocking portion of the foldable backrest upon movement of the foldable backrest to the upright use position and the first armrest to the upright backrest-blocking position to block forward folding movement of the foldable backrest from the upright use position toward the compact folded storage position, wherein the first armrest further includes a movable frame configured to pivot about a pivot axis during movement of the first armrest between the upright backrest-blocking position and the retracted backrest-releasing position and the first armrest anchor is coupled to the movable frame to move therewith, and wherein the movable frame includes a pad base having a lower end and a distal upper end, an arm pivot rod coupled to the lower end of the pad base and to the seat base to establish a pivot axis, and the first armrest pivots about the pivot axis as the first armrest is moved between the upright backrest-blocking position and the retracted backrest-releasing position, and an arm support pad coupled to the distal upper end of the pad base and formed to include the backrest-blocker wall.

14. A compactible juvenile vehicle seat comprising a seat base adapted to set on a vehicle seat and formed to include a seat bottom adapted to support a juvenile in a seated position and an axle associated with the seat bottom, a foldable backrest mounted on the axle for folding movement between an upright use position arranged to extend upwardly away from the seat bottom and adapted to support a juvenile in the seated position on the seat bottom and a compact folded storage position arranged to extend along the seat bottom and lie in confronting relation to the seat bottom, a first backrest lock configured to provide means for retaining the foldable backrest in the upright use position and for releasing the foldable backrest to free the foldable backrest so that, once freed, the foldable backrest can be pivoted about a pivot axis established by the axle to assume the compact folded storage position, wherein the first backrest lock includes a first armrest and a first armrest anchor, the first armrest is mounted to the seat base for movement relative to the seat bottom between an upright backrest-blocking position arranged to lie in confronting relation to the foldable backrest to block forward pivoting movement of the foldable backrest on the axle from the upright use position toward the seat bottom and a retracted backrest-releasing position to free the foldable backrest to pivot on the axle about the pivot axis between the upright use position and the compact folded storage position, and the first armrest anchor includes a latch retainer coupled to the seat base and latch means coupled to the first armrest for releasably mating with the latch retainer upon movement of the first armrest to the upright backrest-blocking position and the foldable backrest to the upright use position to retain the foldable backrest in the upright use position, wherein the first armrest includes a backrest-blocker wall arranged to mate with a blocking portion of the foldable backrest upon movement of the foldable backrest to the upright use position and the first armrest to the upright backrest-blocking position to block forward folding movement of the foldable backrest from the upright use position toward the compact folded storage position, and wherein the blocking portion of the foldable backrest is curved and the backrest-blocker wall is a rearwardly facing, concave, curved surface.

* * * * *